March 20, 1945.  W. E. KINGSTON  2,371,627
COMPOSITE GLASS-METAL ALLOY ARTICLE
Original Filed April 25, 1939
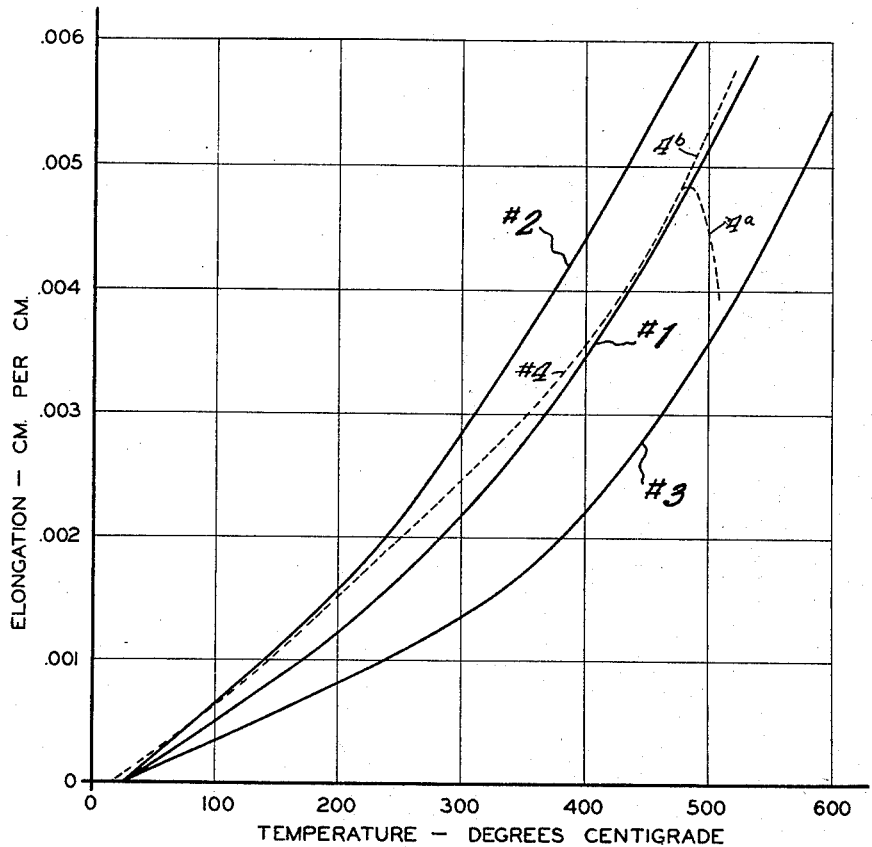
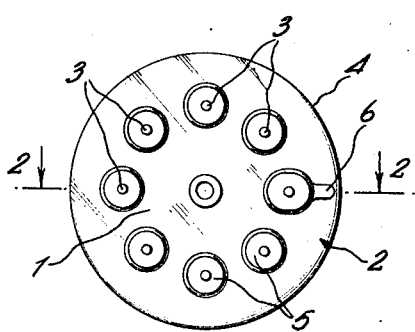
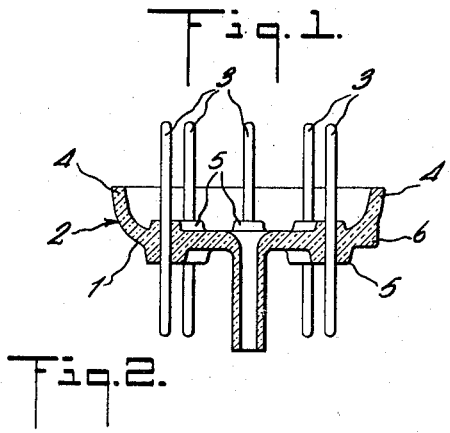
Walter E. Kingston
INVENTOR
BY John J. Logan
ATTORNEY Patented Mar. 20, 1945

2,371,627

UNITED STATES PATENT OFFICE 2,371,627

COMPOSITE GLASS-METAL ALLOY ARTICLE

Walter E. Kingston, Emporium, Pa., assignor to Sylvania Electric Products Inc., a corporation of Massachusetts Original application April 25, 1939, Serial No. 269,855. Divided and this application August 9, 1939, Serial No. 289,112

1 Claim. (Cl. 49—92.5)

This invention relates to metal-glass seals and more especially to alloys which are capable of being sealed into glass bodies in a vacuum-tight manner.

A principal object is to provide a ternary iron-nickel alloy of low chromium content.

Another object is to provide a new stainless alloy.

Another object is to provide an alloy which can be given a desired expansion coefficient over a wide temperature range rendering it useful in thermostats, thermoelectric couples and the like.

Another object is to provide an inexpensive alloy which is capable of being sealed into a soft glass, which seal maintains its vacuum-tight character over a wide range of temperature variations.

Another object is to provide an inexpensive alloy whose expansion characteristics closely match a wide variety of soft glasses.

Another object is to provide an alloy which can be treated to provide a tightly adherent oxide on its surface whereby a vacuum-tight seal can be effected with glass bodies.

A further object is to provide an alloy whose physical properties can be varied by cold working or annealing so as to adapt it to particular kinds of use.

A feature of the invention relates to inexpensive alloys that can be sealed in a vacuum-tight manner to a soft glass having the characteristics of "Corning G-12" glass.

Another feature relates to a nickel-iron-chromium alloy which has a desirable coefficient of linear expansion rendering it suitable for sealing in a vacuum-tight manner to soft grades of glasses.

Another feature relates to a nickel-iron-chromium alloy wherein the greater part of the composition consists of nickel and iron with the remainder consisting of from 3 to 15 percent chromium.

A further feature relates to an improved soft glass header for radio tubes of the type having the contact prongs directly sealed therethrough.

Other features and advantages not specifically enumerated will be apparent after the consideration of the following detailed descriptions and the appended claim.

Fig. 1 shows the temperature-elongation characteristics of the alloys and glass components of a fused joint according to the invention.

Fig. 2 is a cross-sectional view of a radio tube header embodying features of the invention.

Fig. 3 is a bottom view of Fig. 2.

In certain devices, for example electron discharge tubes, it is necessary to provide a glass-to-metal seal which will remain vacuum-tight over long periods and over relatively wide temperature ranges. While this is true in the case of ordinary flexible lead-in wires, it is especially true where the metal part to be sealed into the glass is of rigid construction. Thus there is disclosed in U. S. Patent No. 2,189,260 a radio tube header consisting of a glass bottom-like member through which are sealed the various contact prongs in the form of rigid metal rods. While devices of this category have been successfully manufactured in large quantities, the cost of manufacture has been increased over the ordinary radio tube because of the cost of the usual metal alloys that have been deemed necessary to effecuate the vacuum-tight seal. On the other hand, it is possible to seal a slightly harder glass, for example "Corning 125 AJ" glass together with a chromium-iron alloy, e. g. Allegheny 55. "Corning 125 AJ" glass is similar in composition to Corning G-1 except that it includes a special hardening agent such as MgO of the order of about 2 percent; and Allegheny 55 alloy is essentially composed of from 27 to 30 percent chromium and the balance iron. One type of alloy that has been used in this kind of radio tube header consists of iron, nickel, cobalt and chromium such as described in U. S. Patent No. 2,065,404 and is quite costly to manufacture and work.

I have found that it is possible to make devices such as disclosed in said U. S. Patent No. 2,189,260, with soft glass headers and by using for the prongs an alloy which is relatively cheap to manufacture and work. While the invention is not limited to any particular kind of soft glass, it is particularly useful where the glass-to-metal seal employs a glass of the "Corning G-12" type or "Corning G-1" type. An example of a soft glass corresponding to "Corning G-1" glass that may be used may have the following composition.

| $SiO_2$ | PbO | $Al_2O_3$ | CaO | $Na_2O$ | $K_2O$ | $Mn_2O_3$ |
|---|---|---|---|---|---|---|
| 63.1% | 20.2% | 0.28% | 0.94% | 7.6% | 5.5% | 0.88% |

An example of a soft glass corresponding to "Corning G-12 glass" that may be used may have the following composition—

| $SiO_2$ | PbO | $Al_2O_3$ | CaO |
|---|---|---|---|
| 63.1% (approx.) | 20.2% to 25.5% | 0.28% | 0.94% (approx.) |
| $Na_2O$ | $K_2O$ | $Mn_2O_3$ | LiO |
| 7.6% to 4.6% | 5.5% to 8.5% | 0.88% (approx.) | 0 to 1% |

In accordance with the invention, the alloy consists of from 38 to 45 percent nickel; 3 to 15 percent chromium, and the balance substantially entirely of iron except, if desired, for the addition of a small percentage of manganese to facilitate melting and casting. Preferably, when the alloy is to be sealed to a glass such as "Corning G-1" glass, the preferred proportions are 42 percent nickel; 4 to 8 percent chromium and the balance substantially entirely of iron and a small percentage of manganese of the order of one-fourth of one percent. I have found that an alloy according to the invention in addition to having desirable expansion coefficients over a wide range of temperatures rendering it suitable to form a vacuum-tight weld with soft glasses such as "Corning G-12" or "Corning G-1" glass, also has a relatively high tensile strength of from 125,000 to 150,000 pounds per square inch. This is particularly desirable where the alloy forms the rigid contact prongs of a radio tube. If desired, the alloy can be annealed at a temperature of 1000° C. so as to render it ductile. Furthermore, by heating the alloy at a temperature of 900° C. in a suitable atmosphere, for example an atmosphere of moist $H_2$, a tightly adherent chromium oxide layer is formed on the exterior surface, which facilitates wetting by the molten glass and the formation of a vacuum-tight bond or weld upon subsequent cooling. I have found that by using the range of proportions of alloy constituents as mentioned above, it is possible to vary them to provide a corresponding series of alloys whose mean linear expansion between zero and 300° centigrade can be given any desired value between $60 \times 10^{-7}$ centimeters per degree centigrade, and $150 \times 10^{-7}$ centimeters per degree centigrade.

Thus there is shown in Fig. 1, a family of curves illustrating the characteristics of three separate alloys having compositions within the range of constituents above mentioned. The dotted curve 4 of Fig. 1 represents the expansion characteristic of a soft glass, such for example as "Corning G-12" glass, which has a "softening" point at approximately 475° C. Beyond this "softening" point the glass begins to sag as indicated by the section 4a of the curve. However, by extrapolation, the equivalent elongation can be calculated and is represented by the section 4b of the curve.

Curve No. 1 represents the expansion characteristics upon heating and cooling of an alloy of the above mentioned composition containing approximately 42 per cent nickel; 4 to 8 percent chromium, the balance being iron with a small percentage of manganese. It will be seen that this alloy matches quite closely the characteristic of "Corning G-12" glass. I have found that the match is sufficiently close to enable the manufacture of satisfactory radio tube headers of the type disclosed in said Patent No. 2,189,260, which are free from undesirable strain around the prongs, up to the softening point of the glass, with the result that the vacuum-tight character of the seal remains permanent.

Curve No. 2 shows the expansion characteristic of an alloy consisting of 42 percent nickel; 8 to 12 percent chromium, and the balance iron.

Likewise curve No. 3 illustrates the expansion characteristics of an alloy consisting of 42 percent nickel and the balance iron.

Referring to Fig. 2, there is shown in cross section, a typical radio tube header embodying the invention. The header consists of a glass cup-shaped member having a circular button-shaped bottom 1 and a smoothly curved rim 2, and which terminates in a substantially cylindrical lip 4, the bottom portion at least of the cup-shaped member being preferably formed of a soft grade of glass such as "Corning G-12." Sealed through the member 1 are a plurality of rigid metal rods 3 which extend outwardly to form rigid contact prongs for the radio tube to which the header is sealed in any well-known manner. The prongs are preferably formed of the alloy above mentioned consisting of approximately 42 percent nickel; 4 to 8 percent chromium, and the balance substantially of iron.

Fig. 3 is a bottom view of Fig. 2, from which it will be seen that the portions of the header through which the prongs are sealed, are provided on both sides with integral beads 5. Preferably, one of the beads is oval-shaped and provided with a rib 6 which cooperates with a correspondingly shaped perforation in a metal cup base such as disclosed in said Patent No. 2,189,260, so as to properly locate the prongs with respect to the base. While particular materials and parts have been described however, it will be understood that various changes and modifications may be made without departing from the spirit and scope of the invention. Furthermore, while the alloy according to the invention has been described as applied to a radio tube header, it is capable of other uses where a stainless and easily workable alloy is required. Furthermore, because of its widely adjustable expansion coefficient, it is capable of use as a thermostat element such as in a bi-metallic thermostat, and also as one element of a thermocouple the other of which may be iron or other base metal. In the foregoing description the percentages of the various constituents are in terms of weights. This application is a division of application Serial No. 269,855, filed April 25, 1939. It will be understood of course from the foregoing description, that wherever the balance of the alloy is referred to as being constituted of iron, that the iron may contain one or more impurities whose presence is accidental and do not affect the characteristics of the finished alloy. For example, one alloy that had the desired characteristics pointed out above showed the following on chemical analysis: Carbon 0.15%; manganese 0.21%; silicate 0.27%, chromium 10.18%; nickel 44.06% and the balance iron. Another alloy which possessed the same characteristics showed the following on chemical analysis: Carbon 0.04%; manganese 0.29%; silicate 0.12%; chromium 5.92%; nickel 42.42% and the balance iron.

What I claim is:

A fused joint of vacuum-tight seal between a soft glass having a curved temperature-elongation characteristic varying from zero to approximately 0.005 cm. per cm. over a temperature range of from approximately 25° C. to 500° C. and an alloy consisting of approximately 42 percent nickel; 4 to 8 percent chromium, and the balance not less than 50 percent iron substantially entirely free from cobalt.

WALTER E. KINGSTON.